United States Patent [19]

Natalizia

[11] 4,147,326
[45] Apr. 3, 1979

[54] NON-SPHERICAL BALL VALVE

[75] Inventor: Angelo Natalizia, Smithfield, R.I.

[73] Assignee: International Telephone & Telegraph Corp., Nutley, N.J.

[21] Appl. No.: 870,686

[22] Filed: Jan. 19, 1978

Related U.S. Application Data

[63] Continuation of Ser. No. 593,098, Jul. 3, 1975, abandoned.

[51] Int. Cl.$^2$ ............................................. F16K 5/06
[52] U.S. Cl. ............................... 251/162; 251/192; 251/315
[58] Field of Search ............... 251/315, 160, 162, 192

[56] References Cited

U.S. PATENT DOCUMENTS

| | | | |
|---|---|---|---|
| 2,373,628 | 4/1945 | Gleeson | 251/315 |
| 2,895,710 | 7/1959 | Sanctuary | 251/315 |
| 3,045,693 | 7/1962 | Allen | 251/315 |
| 3,067,978 | 12/1962 | Natho | 251/315 |
| 3,780,985 | 12/1973 | Perry | 251/315 |

FOREIGN PATENT DOCUMENTS 918134  1/1973  Canada ..................................... 251/315

*Primary Examiner*—Martin P. Schwadron
*Assistant Examiner*—H. Jay Spiegel
*Attorney, Agent, or Firm*—John T. O'Halloran; Peter C. Van Der Sluys

[57] ABSTRACT

In a top entry ball valve, a ball having a bore therethrough is provided with chamferred edges around the periphery of the bore at both the inlet and outlet ends. In this manner, due to the geometric configuration of the valve seats, compression sealing takes place only when the valve is closed. When the valve is open, the chamferred edges merely engage the valve seats, thereby allowing easy insertion or removal of the ball-/seat assembly.

9 Claims, 5 Drawing Figures

NON-SPHERICAL BALL VALVE

This is a continuation, of application Ser. No. 593,098, filed July 3, 1975 now abandoned.

BACKGROUND OF THE INVENTION

This invention relates generally to ball valves and, more particularly, to top entry ball valves.

Ball valves are well known and generally consist of a valve body having a central valve chamber, a substantially spherical valve member positioned in the valve chamber, and one or two seat members between the valve member and the ends of the valve chamber. The valve member has an internal passage therethrough which forms a flow path from valve inlet to valve outlet when the valve is in the opened position. A stem projecting through the valve body provides means for rotating the ball 90° between the opened and closed positions.

Originally, seat members for ball valves were formed of various flexible materials, e.g. rubber. This was especially suitable for top entry ball valves; i.e. where the valve chamber has an open top and the ball and valve seats are inserted through this opening, and the opening closed by a bonnet. Top entry construction is beneficial in that it permits removal and replacement of valve seats and the valve member without removal from the flow line of the entire valve structure. Further, the top entry ball valve lends itself to unitary body structure which is capable of enduring line strain much more efficiently than bodies having joints.

Since the flexible seats were easily deformable, no great problem was presented in compressing the seats and valve members together and inserting them as a unit into the valve chamber. However, with increased frequency, valve seats are being formed of more rigid material, e.g. Teflon, which are not easily deformed and therefore present problems of assembly and repair.

As stated previously, most seals have been of the compression type, i.e., each seat is compressed between the valve member and an end wall of the body causing the spherical surface of the ball to maintain intimate contact with the seat, thereby establishing a seal between the body and the seat member and between the valve member and the seat member. Obviously, after a period of time, sufficient wear would result in a decrease of the initial built-in compression, resulting in a leaky valve. It is for this reason that the more sophisticated seat materials are used. However, their greater rigidity makes top entry a problem.

Several techniques have been employed to accommodate rigid seating members while taking full advantage of top entry construction. For example, the valve chamber may be tapered inwardly from the top, thereby resulting in an upper opening sufficiently large for insertion and retraction of the ball and seat assembly. Clearly, precautions must be taken using this type of arrangement in order to insure proper sealing between the ball, seat and body.

A further solution, taught in U.S. Pat. No. 3,067,978, employs a ball having an axial length substantially less than its diameter. In this way, when the ball is in the opened position, it may freely enter the valve housing from a top opening. However, this arrangement provides no sealing between the ball and valve seat when in the opened position, thereby increasing the possibility of leakage.

SUMMARY OF THE INVENTION

It is an object of the present invention to provide a top entry ball valve employing seating members of greater rigidity wherein the ball engages the valve seats in both the opened and closed position.

It is a further object of the present invention that valve seat wear be reduced by providing for compression sealing only when the valve is in the closed position and no compression sealing when the valve is in the opened position.

It is a further object of the invention that the ball have chamferred edges around its inlet and outlet openings of such a geometry that when the ball is in the opened position, the chamferred edges merely engage the valve seats without compression.

According to a broad aspect of the invention, there is provided a valve member for use in a top entry ball valve comprising: a ball member having an internal bore therethrough for forming inlet and outlet openings, the surface region about the periphery of said openings being chamferred.

The above and other objects of the present invention will be more clearly understood from the following detailed description taken in conjunction with the accompanying drawings in which:

DESCRIPTION OF THE PREFERRED EMBODIMENT

Figure 1:
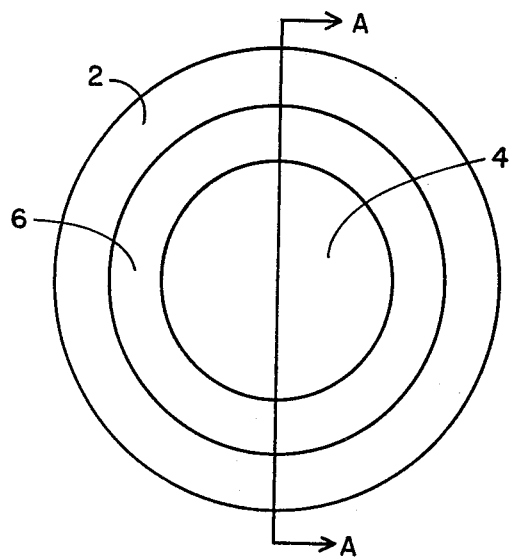
FIG. 1 is a view of a ball for use in a ball valve according to the invention taken along the longitudinal axis of the through path of the ball.
Figure 2:
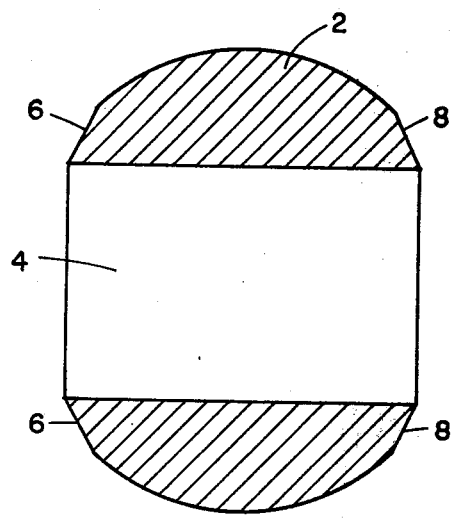
FIG. 2 is a cross-sectional view of the ball of FIG. 1, said section taken along line A—A.

FIGS. 1 and 2 illustrate a valve member 2 having a bore 4 therethrough for communicating with the inlet and outlet ports of a valve according to the present invention. As may be seen, the valve member has a circular cross section in a plane perpendicular to the longitudinal axis of the bore 4. However, the section of FIG. 2 taken along a plane parallel to said axis is not circular. The regions surrounding the periphery of the bore on both the inlet and outlet sides of the valve member are chamferred to provide frustro conical surfaces 6 and 8 on each side of the ball. In FIG. 1, which is a view of the ball taken along the longitudinal axis of the flow path, only one of the frustro conical surfaces is shown. However, both surfaces are clearly shown in FIG. 2.

Figure 3:
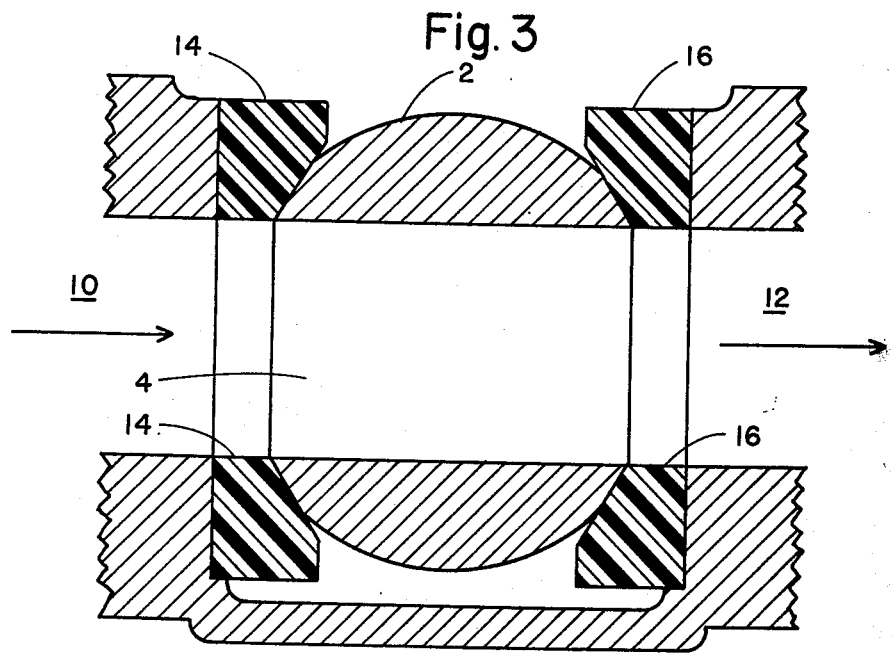
FIG. 3 is a cross-sectional view of the inventive ball and seat members illustrating ball/seat engagement when the valve is in the opened position.

FIG. 3 illustrates inlet and outlet ports 10 and 12 respectively, ball member 2 (shown in the opened position) and valve seats 14 and 16 for providing a seal between ball member 2 and the line. The frustro conical surfaces 6 and 8 cooperate with valve seats 14 and 16 respectively in an "open" position such that the seat material is relaxed, whereas in the closed position the seat material is slightly compressed by the spherical surfaces of the ball. When the ball is in the opened position, the frustro conical surfaces merely engage seats 14 and 16 so that the ball and seat assembly may be freely inserted into an opening in the top of the valve housing. This condition is shown clearly in FIG. 3. When the ball is rotated 90°, i.e., the valve is closed, the spherical surface of the ball compresses the valve seat material, providing the sealing necessary to prevent leakage.

Figure 4:
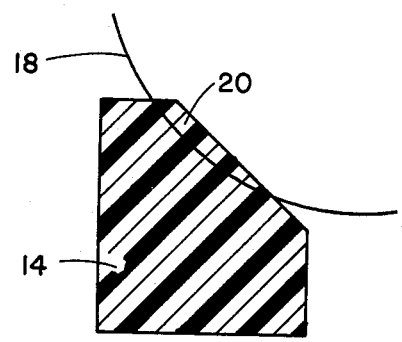
FIG. 4 is a fragmentary cross-section in the region of the seat member illustrating the effect of the ball on the seat member when in the opened position and the closed position.

FIG. 4 illustrates more clearly the relationships between seat and ball when in the closed position. Valve seat 14 is shown in an undistorted condition. Line 18, representing the spherical surface of ball 2 when in the closed position, is seen to intersect area 20 of seat 14. The seat is therefore slightly compressed to the extent that line 18 intersects valve seat 14.

Therefore, it can be seen that wear on the valve seats is substantially reduced since compression sealing takes place only when the valve is closed. When in the open position, the chamferred surfaces merely engage the valve seats, allowing easy insertion or removal of the ball and seat assembly from the valve housing.

Figure 5:
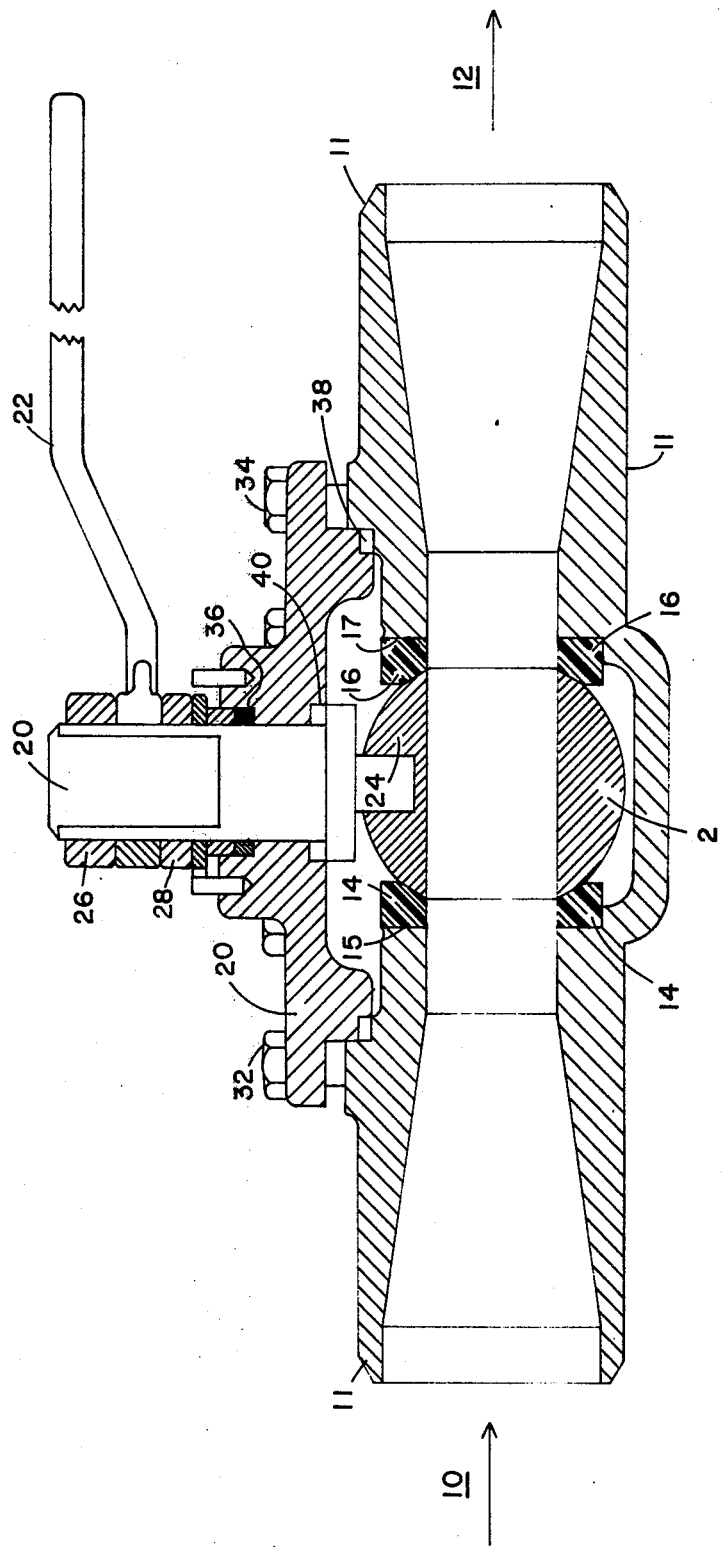
FIG. 5 is a cross-sectional view of a complete ball valve assembly according to the present invention.

FIG. 5 illustrates a complete top entry ball valve assembly. Ball 2 communicates with inlet and outlet ports 10 and 12 of valve body 11 via seats 14 and 16 respectively. A valve stem 20, having a handle 22 coupled thereto, communicates with ball 2 via extension 24. Handle 22 is secured to stem 20 by any suitable means, for example, a nut 26 and stop nut 28. A cover 30 is secured by cap screws 32 and 34. Sealing is provided by stem seal 36, gasket 38 and thrust washer 40.

The valve assembly shown in FIG. 5 may be inserted into a line, and when desirable the ball and seat assembly may be replaced by merely removing cover 30 and extracting the ball and seat assembly. To insert a new ball and seat assembly (or old ball and new seat assembly), the ball is merely placed such that when inserted, the valve will be open. In this state, no compression of the valve seats is necessary and therefore very little force is required for insertion. It should be noted that the walls 15 and 17 of the valve body 11 are parallel to each other, thereby avoiding the problems associated with tapered construction as previously mentioned.

While the principles of the invention have been described above in connection with specific apparatus, it is to be clearly understood that this description is made only by way of example and not as a limitation on the scope of the invention.

What is claimed is:

1. A ball and seat assembly for use in a top entry ball valve of the type that includes a housing having opposed inlet and outlet ports and seat engaging surfaces surrounding said ports, said ball and seat assembly, comprising:
    a ball member having an internal bore therethrough forming inlet and outlet openings, said ball member having an outer spherical surface region merging into contiguous relieved outer chamfered surface regions, said relieved outer chamfered surface regions surrounding the peripheries of said inlet and outlet openings;
    a first valve seat having a ball engaging surface and a housing engaging surface, said seat adapted to be disposed between the seat engaging surface surrounding the inlet port and said ball member; and
    a second valve seat having a ball engaging surface and a housing engaging surface, said seat adapted to be disposed between the seat engaging surface surrounding the outlet port and said ball member, the ball member and valve seats being of a size so that when the ball member and valve seats are assembled with the ball engaging surfaces of the valve seats engaging the relieved outer chamfered surface regions of the ball member, the assembly may be slidably received with substantially no restraint between the seat engaging surfaces of the housing, whereby the valve seats hold the ball member in place within the housing by merely engaging the seat engaging surfaces of the housing and said relieved outer chamfered surface regions of the ball when the ball member is disposed in an open position with the bore in communication with the housing ports and the outer spherical surface region of the ball member sealingly compresses the valve seats when the ball member is disposed in a closed position with the outer spherical surface of the ball member engaging the ball engaging surfaces of the seats.

2. A ball and seat assembly according to claim 1 wherein said chamferred regions form frustro conical surfaces.

3. A ball and seat assembly as described in claim 1, wherein the seat engaging surfaces of the housing are separated by a predetermined distance, and the housing engaging surfaces of the seats are separated by substantially said predetermined distance when the ball member and valve seats are assembled with the ball engaging surfaces of the valve seats merely engaging the relieved outer chamfered surface regions of the ball member without compressing said valve seats.

4. A top entry ball valve, comprising:
    a housing having a top opening extending to a chamber, opposed inlet and outlet ports communicating with said chamber and seat engaging surfaces surrounding said ports and partially defining said chamber;
    a ball member having an internal bore therethrough forming inlet and outlet openings, said ball member having an outer spherical surface region merging into contiguous relieved outer chamfered surface regions, said relieved outer chamfered surface regions surrounding the peripheries of said inlet and outlet openings, said ball member being located within the chamber of the housing;
    first and second valve seats, each having a ball engaging surface and a housing engaging surface, said first valve seat being disposed between the seat engaging surface surrounding the inlet port and said ball member, and said second valve seat being disposed between the seat engaging surface surrounding the outlet port and said ball member, the ball member and valve seats being of a size so that when the ball member and valve seats are in an open position with the ball engaging surfaces of the valve seats engaging the relieved outer chamfered surface regions of the ball member, the valve seats and ball member may be slidably received into the chamber without significant compression of the valve seats which hold the ball member in place within the chamber by merely engaging the seat engaging surfaces of the housing and said relieved outer chamfered surface regions of the ball and when the ball member is disposed in a closed position, the outer spherical surface region of the ball member engages the ball engaging surfaces of the valve seats to sealingly compress the valve seats and close the ball valve;

means for closing the chamber at the top of the valve; and means for rotating the ball between the open and closed positions.

5. A top entry ball valve according to claim 4 wherein said chamferred regions form frustro conical surfaces.

6. A top entry ball valve as described in claim 4, wherein the inlet and outlet ports of the housing are formed along an axis and the seat engaging surfaces are parallel to each other and in planes perpendicular to the axis.

7. A top entry ball valve as described in claim 4, wherein the ball engaging surfaces of the valve seats are substantially parallel to said chamfered surface regions of the ball member when the ball is in the open position.

8. A top entry ball valve as described in claim 4, wherein the ball member is of a floating type held in position only by the valve seats.

9. A top entry ball valve as described in claim 4, wherein the seat engaging surfaces of the housing are separated by a predetermined distance, and the housing engaging surfaces of the seats are separated by substantially said predetermined distance when the ball member and valve seats are assembled with the ball engaging surfaces of the valve seats merely engaging the relieved outer chamfered surface regions of the ball member without compressing the valve seats.

* * * * *